Aug. 25, 1970 — N. J. BROWN — 3,525,670

TWO-PHASE FLUID CONTROL SYSTEM

Filed Dec. 17, 1968

INVENTOR.
NORMAN J. BROWN

BY

ATTORNEY

United States Patent Office 3,525,670
Patented Aug. 25, 1970

3,525,670
TWO-PHASE FLUID CONTROL SYSTEM
Norman J. Brown, Livermore, Calif., assignor to the United States of America as represented by the United States Atomic Energy Commission
Filed Dec. 17, 1968, Ser. No. 784,343
Int. Cl. G21c 7/22, 7/00; F08d 15/00
U.S. Cl. 176—86                                 5 Claims

ABSTRACT OF THE DISCLOSURE

A closed loop, two-phase fluid control system for a nuclear space reactor including: a vessel disposed in the core region of the reactor and having an internal capillary structure gradient for coalescing a liquid phase neutronic reactive fluid into a continuous liquid body; a condenser external to the reactor core for respectively condensing and cooling the vapor and liquid phases of the fluid exiting from the vessel; an external regulator for controlling the flow rate of the liquid phase fluid into the vessel; and an external pressure regulator for controlling the vapor pressure of the vapor phase fluid in the vessel.

BACKGROUND OF THE INVENTION

The invention described herein was made in the course of, or under, Contract No. W-7405-ENG-48 with the United States Atomic Energy Commission.

This invention relates to control systems for nuclear space reactors, and more particularly to a two-phase fluid control system.

Liquid control schemes for nuclear space reactors, as known in the prior art, circumvent the materials problems of the mechanical control schemes operating in the "white hot" core region of space power reactors. However, these prior liquid schemes have inherent complex problems also, these problems being primarily associated with moving a liquid in a free-fall environment, i.e., in an environment where no force serves to maintain a density gradient, an example of such force being gravity.

More specifically, a liquid gas interface having a specific orientation cannot be maintained in a free-fall environment. Consequently, a system in which pressurized gas is used to move a liquid in space, as in the prior known liquid systems, involves a complex valving arrangement for preventing dispersion of the liquid in the gas. Another inherently different prior liquid control system involves changing the mixture ratio of two liquids with very different neutronic properties in a liquid full circulating loop, the system being irreversible and has very definite control limits imposed by the finite amount of the liquids available in space.

SUMMARY OF THE INVENTION

The present invention provides a simple system and unique method of operation which circumvents the afore-discussed complexities of the prior liquid control schemes for space power reactors. The operational lifetime of the inventive system is limited only by the effective neutronic lifetime of the neutronic reactive fluid utilized therein. The present system provides an effective, simple means for maintaining a liquid-gas interface in a free-fall environment in addition to being completely reversible.

Advantages afforded by the novel apparatus of the inventive system are start-up and shutdown capability, high reliability due to the absence of moving parts in the "white hot" core region of a space power reactor, and inherent failsafe operation through proper selection of materials which would effect a negative void coefficient in the reactor.

Therefore, it is the object of this invention to provide a two-phase fluid control system for a space power reactor operating in either gravity or gravity free environment.

A further object of the invention is to provide a closed loop, two-phase fluid control system for a nuclear reactor and method of operating the same.

Another object of the invention is to provide a simple control system for a space reactor in which the operational life thereof is limited only by the effective neutronic lifetime of the neutronic reactive fluid utilized therein.

Another object of the invention is to provide a two-phase fluid control system capable of maintaining a liquid-gas interface in a free-fall environment.

Another object of the invention is to provide a closed loop, two-phase fluid control system which is completely reversible and which incorporates an internal capillary structure gradient for coalescing a liquid phase neutronic reactive fluid into a continuous liquid body and means for controlling the flow rate of the liquid phase and means for controlling the pressure of the vapor phase of the fluid.

Other objects of the invention, not specifically set forth above will become readily apparent from the following description and accompanying drawings.

DESCRIPTION OF THE INVENTION

As pointed out above, this invention is directed to a neutronic control system particularly adapted for a nuclear space reactor and method for operating same. While the description of the invention is directed to nuclear space reactor applications, it is not intended to limit the invention to this specific area in that the invention can be effectively utilized in other types of reactors. Generally, the apparatus of the system comprises a closed fluid circulation loop including a vessel disposed within the reactor core, an external condenser, and flow control and pressure regulating mechanisms. The vessel has an internal capillary structure for creating a capillary-pressure gradient within the vessel. A liquid phase neutron reactive fluid is circulated in the capillary structure of the vessel which coalesces the liquid by capillary action. The neutron reactive fluid may be a neutron absorber, a neutron reflector, or a neutron emitting material. Heat generated by the reactor heats the coalesced neutron reactive fluid to a liquid-vapor phase equilibrium state. The neutron reactive fluid exits from the vessel in either liquid phase, vapor phase, or both, whereupon the vapor phase is condensed and the liquid phase is cooled by circulation through the condenser. The resultant liquid phase fluid is then recirculated back into the vessel. By regulating the vapor pressure in the vessel and controlling the flow rate of the liquid phase neutron reactive fluid into the vessel, the cross-sectional area of the coalesced liquid can be varied, which thereby affords neutronic control of the reactor if the vessel is placed in an effective control region of the reactor.

Hereinafter, the pressure vessel having an internal capillary structure for coalescing a liquid neutron reactive material shall be referred to as the control vessel. Also, the term "fluid" refers to a two-phase material state wherein the specific phase of the material may be liquid, vapor, or both. The neutron reactive fluid, for example, may be a high neutron-absorption cross section component such as lithium-6, a low neutron-absorption cross section component such as the lithium-7 isotope, or a suitable mixture of these components.

Figure 1:
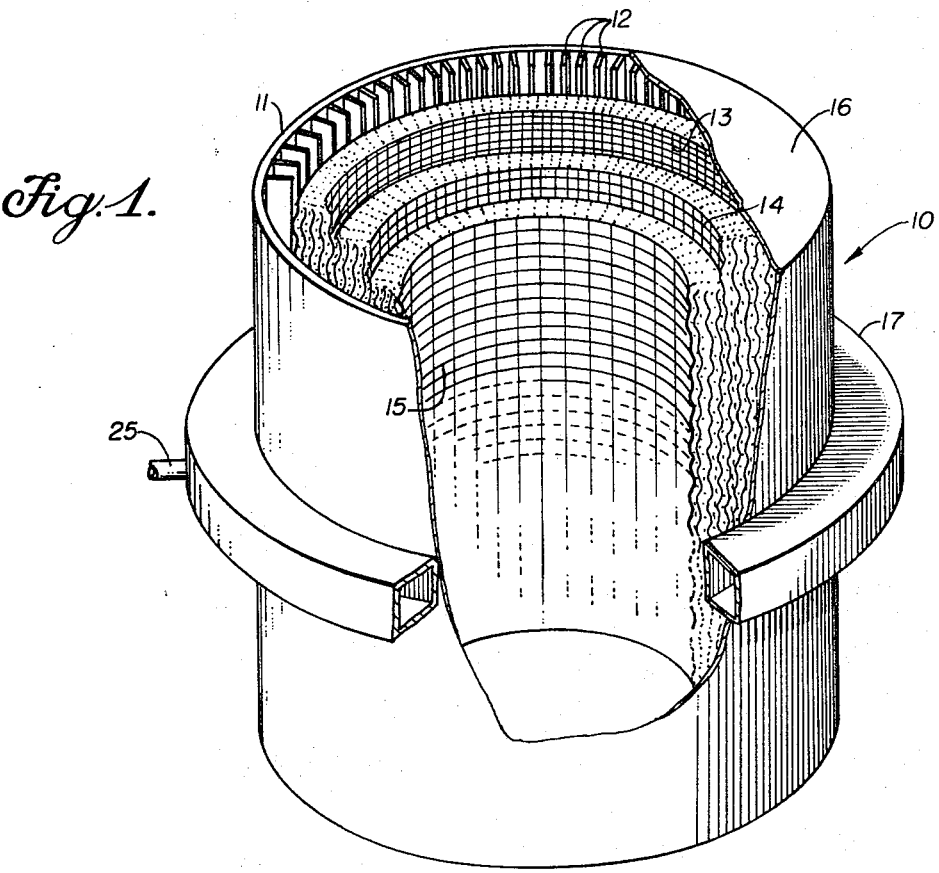
FIG. 1 is a perspective view of an embodiment of the control vessel of the novel system with sections broken away to illustrate the internal construction thereof.
Figure 2:
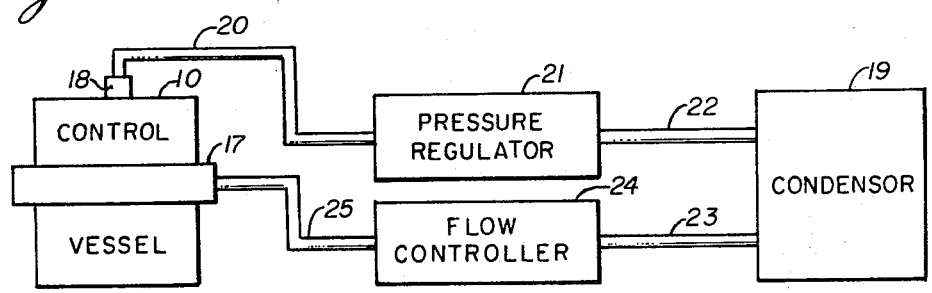
FIG. 2 is a diagrammatic view of the inventive control system incorporating the FIG. 1 control vessel.

Referring now to the drawings, FIG. 1 shows the sectional details of an embodiment of the control vessel utilized in the FIG. 2 system, and generally indicated at 10. Control vessel 10 is composed of a housing or container having an annular wall 11 with a plurality of closely spaced thin, longitudinally extending fins 12 defining a fine capillary structure on the interal surface of wall 11; a very fine mesh wire screen assembly 13 positioned adjacent the radially inter edges of fins 12, with a coarser mesh wire screen assembly 14 mounted adjacent to screen assembly 13, and a still coarser mesh wire screen assembly 15 mounted adjacent to screen assembly 14. The wire screen assemblies 13, 14 and 15 are of a desired radial thickness and serve to define a capillary force gradient which increases from the central axis of the control vessel 10. Screen assemblies 13, 14 and 15 are mounted within vessel 10 such as by attachment thereof to the upper and/or lower ends of vessel 10, the upper end thereof being indicated at 16. An annulus 17 is positioned about the external surface of wall 11, the portion of wall 11 surrounded by annulus 17 being provided with opening through which the fluid flows into the capillary structure defined by fins 12. Control vessel 10 is also provided with a centrally located fluid exit or outlet 18 in the upper end 16 of housing 11 as shown in FIG. 2. While not shown, it may be desirable to place screens periodically transverse to the principal axis of the control vessel to restrict the movement of droplets which may be separated from the liquid in gravity free environments.

FIG. 2 illustrates the entire novel control system diagrammatically with control vessel 10 being connected to a condenser 19. Connected to the outlet 18 of control vessel 10 is a conduit 20 which in turn is connected to a pressure regulator 21, regulator 21 being connected to condenser 19 via a conduit 22. Condenser 19 is connected by a conduit 23 to a liquid flow-controller 24 which in turn is connected to the annulus 17 of control vessel 10 by a conduit 25.

The FIG. 2 system operates in the following manner: a neutron reactive liquid is directed into the control vessel 11 via annulus 17 at a rate controlled by the flow controller 24. The internal capillary structure afforded by the thin closely spaced internal fins 12 and the wire mesh screen assemblies 13, 14 and 15 coalesces the liquid into an annular configuration within the vessel 10. Heat from the reactor heats the coalesced liquid to a liquid-vapor saturation equilibrium state. Pressure control is afforded by the pressure regulator 21. The neutron reactive fluid discharges from the control vessel 10 via outlet 18 and through regulator 21 to condenser 19. The fluid is then condensed in condenser 19 to a subcooled state in order that a pressure drop be maintained between the pressure regulator 21 the flow controller 24. The liquid section of the condenser 19 is a filled capillary structure so that vapor pressure will be transmitted to the liquid, thereby providing the necessary force for moving the condensed liquid to the flow controller 24. The flow controller comprises means for injecting the condensed liquid into the higher pressure control vessel 10 from the lower pressure condenser 19 at a precisely controllable rate.

As pointed out above, the heat generated by the reactor maintains the liquid and vapor phases of the neutron reactive fluid in the control vessel 10 at saturated states as determined by the pressure, which is controllable by the pressure regulator 21. After an equilibrium status is reached, the rate at which the neutron reactive fluid enters the control vessel as a liquid is equal to the rate at which the fluid exits from the vessel as a vapor. The heat transmitted through the liquid orientation or configuration within the vessel by conduction and the heat generated in this liquid by radiation is equal to the heat energy used to vaporize the liquid in its saturated state.

This equilibrium status within the control vessel 10 can be arbitrarily varied by suitable manipulations of pressure in and liquid flow into the control vessel. More specifically, neutronic control of the reactor is afforded by variation of the cross sectional area of the liquid orientation in the control vessel. The cross sectional area of this liquid orientation within the vessel can be varied by either simultaneously regulating vapor pressure and liquid flow in the control vessel 10 or by independently varying the pressure or flow. For example, initially assuming an equilibruim status where the cross sectional area of the liquid orientation is constant, if the pressure is raised, the liquid and vapor phases of the neutron absorbent fluid are no longer in saturated status. In this case, the rate of evaporation of the liquid would drop off. However, the liquid still flows into the control vessel at the same rate and the cross sectional area of the liquid orientation increases, which in turn causes a conductive heat loss. This heat loss further slows the evaporation rate of the liquid orientation. It is obvious that a new equilibrium status would be reached in which the cross sectional area of the liquid orientation would be increased. Analogously, by lowering the pressure, the cross sectional area of the liquid orientation can be decreased.

Also, the cross sectional area of the liquid orientation can be varied by maintaining the pressure constant and varying the flow rate. However, it is obviously more rapid to control this cross sectional area by simultaneously regulating the pressure and the liquid flow rate.

By proper choice of neutron reactive materials, the control vessel can have either a positive void coefficient or a negative void coefficient. More specifically, the neutron reactive fluid could be, as pointed out above, a neutron absorber, a neutron reflector, or a neutron emitting material. The present preferred fluidic material is either a neutron absorber or a neutron reflector.

The inventive system and method has been tested, with results showing that the system can effectively compensate for long range reactivity changes and produce large reactivity shifts necessary for start-up and shutdown for present space power reactor plants.

It has thus been shown that the advantages afforded by the inventive system are start-up and shutdown capability, high reliability due to the absence of moving parts in the "white hot" core region of a reactor, such as the space power reactors and inherent failsafe operation through proper selection of the neutron reactive fluid utilized therein. In addition the operational lifetime of the inventive system is limited only by the effective neutronic lifetime of the neutronic reactive fluid utilized. Also, the system provides an effective, simple means for maintaining a liquid-gas interface in a free-fall environment, as well as being completely reversible.

It is within the scope of this invention to include the evaporator and condenser units within a single pressure vessel including the intermediate mechanisms such as the flow controller by suitably simple mechanisms such as restricted flow passages. Also, the liquid and vapor may be, but need not be, of identical chemical composition. The vapor, for example, may be a separate element or compound absorbed in the liquid or produced from the liquid by chemical combination or dissociation.

Although a specific embodiment of the invention has been illustrated and described, modifications will become apparent to those skilled in the art, and it is intended to cover in the appended claims all such modifications as come within the spirit and scope of the invention.

What is claimed is:

1. A closed loop fluid neutronic control and heat transfer system for reactors comprising: serially connected fluid condenser, fluid flow controller, fluid pressure regulator, and at least one control vessel; said closed loop system containing a two-phase neutron reactive fluid; said control vessel being adapted to be disposed in a core region of an associated reactor; said condenser, flow controller and pressure regulator being adapted for external location with respect to an associated reactor core; said control vessel containing an interior structure having numerous interconnected capillary cavities, each of said capillary cavities defining a void space of increasing cross-sectional area and being oriented in the same direction to produce a capillary pressure gradient for coalescing said neutron reactive fluid into a continuous liquid body, whereby said fluid is circulated through said control vessel and is heated by an associated reactor to a liquid-vapor state which is condensed and cooled by said condenser, the rate of fluid and vapor passing into and out of said control vessel being determined by said flow controller and said pressure regulator.

2. The system defined in claim 1, wherein said capillary structure comprises a plurality of longitudinal fins annularly arranged within said control vessel and spaced at distances effective to produce capillary action upon fluid between said fins, and a series of coaxial annular screen assembly means of increasing mesh size disposed within said vessel in close proximity to said fins, said fins and said screen assembly means of successively larger mesh size effectively defining radial capillary void channels within said control vessel.

3. The system defined in claim 2, wherein said series screen assembly means are positioned radially inward with respect to said fins, and wherein said increasing mesh size of said screen assembly means increases radially inwardly.

4. The system defined in claim 3, wherein said plurality of longitudinal fins are located around the internal surface of said control vessel and extend radially inward toward said series of screen assembly means.

5. The system defined in any one of claims 1, 2, 3 and 4, wherein said two-phase neutron reactive fluid is selection from the group consisting of a neutron absorber material, a neutron reflector material, and a neutron emitting material.

References Cited

UNITED STATES PATENTS

| | | | |
|---|---|---|---|
| 3,229,759 | 1/1966 | Grover | 165—105 |
| 3,378,449 | 4/1968 | Roberts et al. | 176—33 |
| 3,402,767 | 9/1968 | Bohdansky et al. | 165—105 |

CARL D. QUARFORTH, Primary Examiner

H. E. BEHREND, Assistant Examiner

U.S. Cl. X.R.

165—105, 107; 176—28, 33